Aug. 23, 1960　　　F. L. TARLETON ET AL　　　2,949,715
MACHINES FOR MAKING HEAT-INSULATING UNITS
Filed Oct. 8, 1957　　　　　　　　　　　　　9 Sheets-Sheet 1

INVENTOR.
Frederic L. Tarleton
Thomas S. Simms
BY
Smith, Prangley, Baird & Clayton
Attys.

Aug. 23, 1960     F. L. TARLETON ET AL     2,949,715
MACHINES FOR MAKING HEAT-INSULATING UNITS
Filed Oct. 8, 1957     9 Sheets-Sheet 2

INVENTOR.
Frederic L. Tarleton
Thomas S. Simms
BY
Smith, Prangley, Baird & Clayton
Attys.

United States Patent Office

2,949,715
Patented Aug. 23, 1960

2,949,715

MACHINES FOR MAKING HEAT-INSULATING UNITS

Frederic L. Tarleton, Oak Park, and Thomas S. Simms, Bensenville, Ill., assignors to General Electric Company, a corporation of New York Filed Oct. 8, 1957, Ser. No. 688,887

14 Claims. (Cl. 53—112)

The present invention relates to machines for making heat-insulating units for refrigerator cabinets, or the like, and particularly the heat-insulating units of the character of that disclosed in the copending application of Thomas S. Simms and Arthur J. Harder, Jr., Serial No. 688,977, filed October 8, 1957.

The heat-insulating units disclosed in the Simms and Harder application mentioned essentially comprises an hermetically sealed bag enclosing both a porous mass of solid poor heat-conducting material and a charge of a gas having a coefficient of thermal conductivity lower than that of air and thoroughly permeating the porous mass of material, wherein the bag is constructed of a flexible multi-ply laminate provided with an intermediate ply of kraft paper having a high tear resistance and an inner ply of organic resin having a low permeability and an outer ply of organic resin having a high abrasion resistance. In the unit, the heat-insulating material may conveniently comprise a self-supporting deformable bat of glass fibers, and the gas may conveniently comprise dichlorodifluoromethane. In the laminate: the organic resin of the inner ply may conveniently comprise a vinylidine chloride copolymer resin, as this material may be readily sealed by the application thereto of heat and pressure, and as this material has a low permeability to light atmospheric gases, including water vapor; while the organic resin of the outer ply may conveniently comprise polyethylene, as this material has a high abrasion resistance. Finally, in the laminate, the several plies are secured together with corresponding layers of adhesive that may conveniently comprise copolymers of butadiene and acrylonitrile.

In the manufacture of refrigerator cabinets, a great number of these heat-insulating units are required; whereby it is a general object of the invention to provide a method of and a machine for making a heat-insulating unit of the character described in a simple and economical manner and upon a mass production basis.

Another object of the invention is to provide a machine for making heat-insulating units of the character noted that involves an improved sequence of steps insuring substantially complete exhausting of air from the assembly of the elements of the unit prior to sealing of the bag thereof, followed by proper charging of the bag with the low thermal conductivity gas at the proper pressure and temperature, and then followed by hermetic sealing of the bag so as to retain the required charge of the gas in the bag while excluding light atmospheric gases, including water vapor, therefrom.

A further object of the invention is to provide in combination with the machine of the character noted an improved automatic control circuit therefor that insures the desired sequence and control of the steps, without the supervision of the operator.

A still further object of the invention is to provide in a machine of the character described an improved and simplified arrangement for effecting the heat-sealing of the bag of the unit and involving an electronic arrangement that is exceedingly fast, totally reliable and altogether safe in operation.

Further features of the invention pertain to the particular arrangement of the steps of the method and of the elements of the machine, whereby the above-outlined and additional operating features thereof are attained.

The invention, both as to its organization and method of operation, together with further objects and advantages thereof, will best be understood by reference to the following specification taken in connection with the accompanying drawings, in which.

Figure 1:
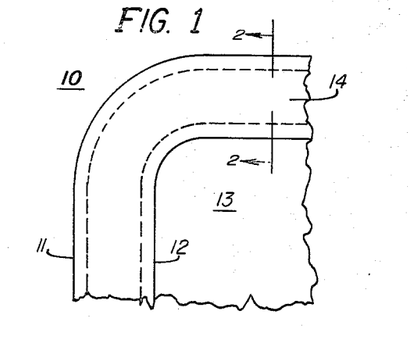
Figure 1 is a fragmentary front view of the upper left-hand portion of a household refrigerator cabinet incorporating a heat-insulating unit that is made by the machine of the present invention.
Figure 2:
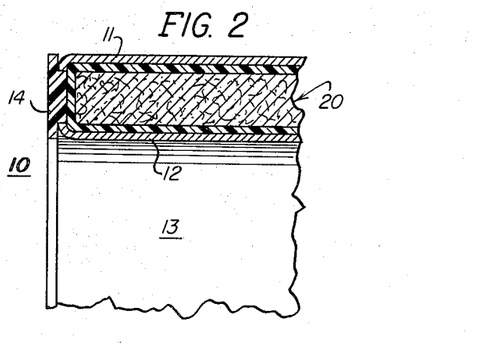
Fig. 2 is a fragmentary vertical sectional view of the refrigerator cabinet, taken in the direction of the arrows along the line 2—2 in Fig. 1.

Referring now to Figs. 1 and 2 of the drawings, there is illustrated a cabinet 10 for a household refrigerator, or the like, incorporating a number of heat-insulating units 20, as more fully described hereinafter; which cabinet 10 comprises a metal outer shell 11 and a metal inner liner 12, both of box-like form, the metal inner liner 12 being arranged in nested relation within the metal outer shell 11. The cabinet 10 constitutes a portion of a household refrigerator, as previously noted, and cooperates with a refrigerator machine, not shown, that includes a refrigerant evaporator that is operatively associated with a food storage space 13 defined within the inner liner 12 for the cooling purpose. A substantially rectangular heat-insulating frame strip 14, usually formed of a suitable molded plastic material, is arranged about the open front of the cabinet 10 and joining the boundary edges of the outer shell 11 and the inner liner 12. Arranged within the space defined between the outer shell 11 and the inner liner 12 are a number of heat-insulating units 20, as previously noted, of pillow-like construction; which heat-insulating units 20 are designed nicely to fit between the outer shell 11 and the inner liner 12 and substantially completely to fill-up the space disposed between the elements 11 and 12. For example, the space between the outer shell 11 and the inner liner 12 may be nicely filled by a pair of cooperating and differently constructed ones of the heat-insulating units 20, a first of these heat-insulating units being deformed into a substantially U-shape and arranged to fill the top and side portions of the space noted, and a second of these heat-insulating units being deformed into a substantially L-shape and arranged to fill the bottom and rear portions of the space noted.

Figure 3:
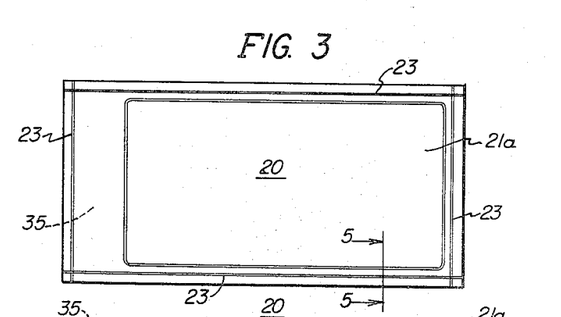
Fig. 3 is a reduced plan view of one of the heat-insulating units incorporated in the refrigerator cabinet shown in Figs. 1 and 2.
Figures 4, 5:
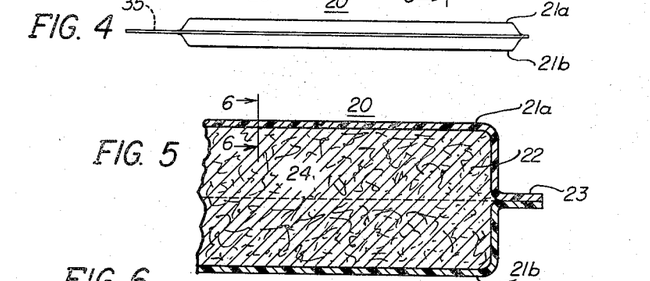
Fig. 4 is a reduced side view of the heat-insulating unit shown in Fig. 3.
Fig. 5 is an enlarged fragmentary vertical sectional view of the heat-insulating unit, taken in the direction of the arrows along the line 5—5 in Fig. 3.

Referring now to Figs. 3 to 5, inclusive, of the drawings, the heat-insulating unit 20 there illustrated is of substantially pillow-like form and of substantially rectangular configuration. Preferably, the heat-insulating unit 20 is of the construction and arrangement disclosed in the previously mentioned Simms and Harder applications; which unit 20 comprises a pair of complementary sheets 21a and 21b disposed on opposite sides of a slab or mattress 22 of heat-insulating material; which sheets 21a and 21b are drawn down around the mattress 22 and sealed about the meeting marginal edges thereof, as indicated at 23, thereby to define an hermetically sealed bag enclosing the mattress 22. Also, the bag of the unit 20 comprises a charge (indicated by the reference character 24) of gas thoroughly permeating the porous mass of the mattress 22 and having a substantially lower thermal conductivity than that of air.

Figure 6:
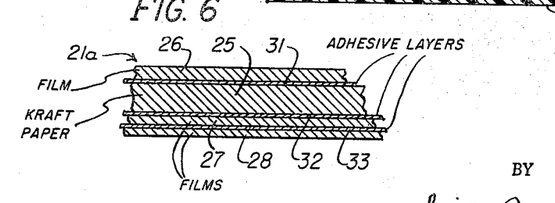
Fig. 6 is a greatly enlarged fragmentary sectional view of a wall of the bag of the heat-insulating unit, taken in the direction of the arrows along the line 6—6 in Fig. 5.

The sheets 21a and 21b are identical, each comprising a flexible sheet-like wall formed of low thermal conductivity materials and constituting a unitary multi-ply laminate; and specifically, as shown in Fig. 6, the sheet 21a comprises an intermediate ply 25 of kraft paper having a high tear strength, an outer ply 26 of organic resin having a high abrasion resistance, and two inner plies 27 and 28 of organic resin having a low permeability to gas and air and water vapor. In the laminate 21a, the outer ply 26 is intimately bonded to the intermediate ply 25 by a layer of adhesive 31, the inner ply 27 is intimately bonded to the intermediate ply 25 by a layer of adhesive 32, and the inner ply 28 is intimately bonded to the inner ply 27 by a layer of adhesive 33.

More specifically, in the laminate 21a: the ply 25 comprises a sheet of supercalendered kraft paper of 40# gauge having a thickness in the general range 4 to 5 mils; the ply 26 comprises a film of polyethylene having a thickness of about 2 mils; and each of the plies 27 and 28 comprises a film of "Saran" having a thickness of about 1 mil. The material "Saran" essentially comprises vinylidene chloride copolymers, one form of the material comprising vinylidene chloride and vinyl chloride copolymers resin, and another form of this material comprising vinylidene chloride and acrylonitrile copolymers resin. The kraft paper ply 25 is supercalendered so that it will not abrade or puncture the adjacent plies 26 and 27. The adhesive layers 31, 32 and 33 essentially comprise a "Hycar" rubber cement or adhesive that consists essentially of copolymers of butadiene and acrylonitrile.

In the unit 20, the mattress 22 may be formed of a number of suitable heat-insulating materials, but it preferably comprises a mass or slab of loosely packed glass fibers, the glass fibers being suitably matted to render the bat or mattress sufficiently self-supporting and integrated to accommodate ready handling thereof. Likewise, the charge 24 of gas may take the form of a number of suitable heavy gases having a thermal conductivity lower than that of air, but it preferably essentially comprises dichloro-difluoromethane ("Freon-F12"), as this material is very advantageous, having a thermal conductivity lower than that of air, and having a boiling point that is well below the normal operating temperature range of the unit.

It is noted that when the refrigerator cabinet 10 is employed in the storage of food in a frozen condition, the temperature of the refrigerator space 13 may be as low as —30° F.; whereas when the refrigerator cabinet 10 is not in use and is involved in railway transportation or in warehouse storage, the temperature of the space 13 may be as high as +150° F. Accordingly, the design of the unit 20 contemplates this "operating temperature range," as explained more fully hereinafter.

Again referring to Figs. 3 to 6, inclusive, of the drawings, in the unit 20, the bag is substantially rectangular in plan having a length of about 32" and a width of about 17" and a thickness of about 1¾"; while the mattress has a length of about 25½", a width of about 14" and a thickness of about 1¾".

In manufacturing the units 20, a plurality of stock sheets of rectangular form and of the construction and composition previously described are provided; and normally in the adhesive layer 31, a coloring pigment is incorporated, so that the operator may readily distinguish the outside of the composite laminate from the inside thereof. For example, with reference to Fig. 6, a coloring agent (for instance green) is incorporated in the adhesive layer 31, thereby to serve as an indication that the green side of the composite laminate 21a is the outside thereof, since it is desirable to have the polyethylene film 26 disposed to the outside of the bag in the completed heat-insulating unit 20. Of course, the inside of the composite laminate 21a has a brown color, the natural color of the kraft paper ply 25, thereby marking it for the purpose noted, since it is desirable that the inner plies 27 and 28 of the composite laminate 21a be disposed interiorly of the bag of the finished heat-insulating unit 20.

Figure 7:
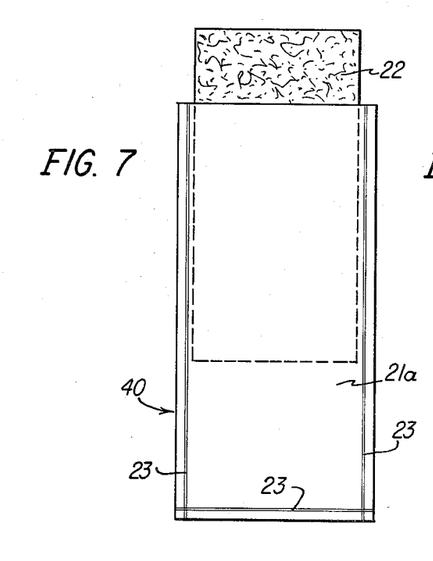
Figs. 7 and 8 are reduced plan views, similar to Fig. 3, of an assembly employed in the method of making the heat-insulating unit.

Continuing with the method of manufacture of one of the heat-insulating units 20, a pair of the composite sheets 21a and 21b are arranged in proper face-to-face relation, the green color being arranged to the outside in both sheets; and the assembly is transferred to a sealing machine that is operated to effect sealing of the laminates together about the two sides and one end thereof so as to produce a bag having an open end, as illustrated in Fig. 7. The sealing machine may be of the electronic sealing type, wherein suitable heat and pressure are applied to the pair of assembled sheets effecting the fusion about the two sides and one end of the perimeter thereof, as indicated at 23 in Fig. 7.

Figure 8:
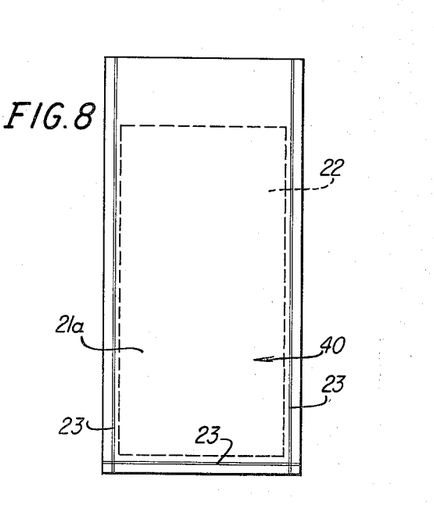

As previously noted, the slab or mattress 22 of glass fibers is self-supporting, to accommodate ready handling thereof; and the slab 22 is inserted into the open end of the bag, as illustrated in Fig. 7. The slab 22 is shorter than the bag, as previously noted, whereby a considerable vacant throat extension (about 6") is provided in the bag, when the slab 22 occupies its normal position therein, as illustrated in Fig. 8. At this time, the interior surfaces of the bag in the throat extension may be wiped in order to insure that there are no loose glass fibers in this area of the facing inner plies 28 of the cooperating laminates 21a and 21b; whereby at this time the composite assembly, indicated at 40, in Fig. 8 is produced.

Figure 9:
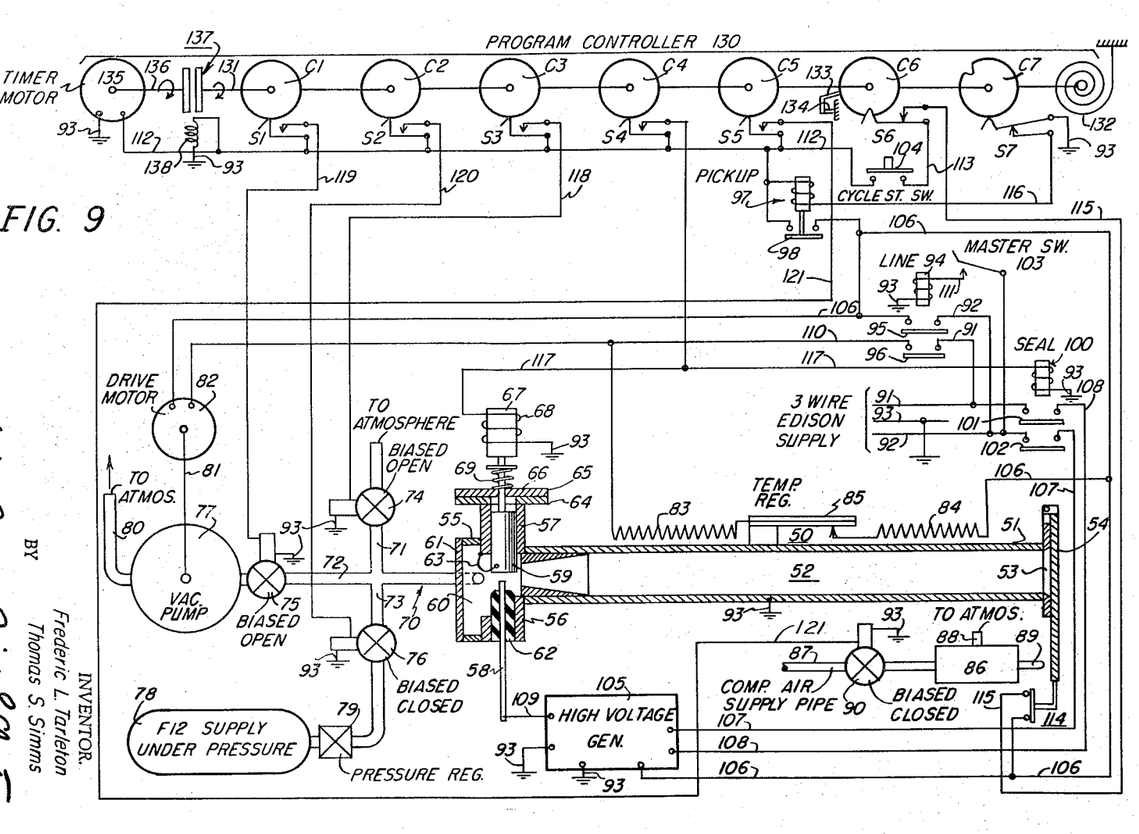
Fig. 9 is a diagrammatic illustration of the machine for making the heat-insulating units and of the electric control circuit therefor.

The composite assembly 40 of Fig 8 is then transferred to the filling and sealing machine 50 illustrated in detail in Figs. 11 to 24, inclusive; however, the manufacturing method will be best understood by reference to Fig. 9, wherein the machine 50 is shown in diagrammatic form.

Referring now to Fig. 9, the machine 50 there diagrammaticaly illustrated, and embodying the features of the present invention, is especially designed for the purpose of converting the assemblies 40 of Fig. 8 into the completed heat-insulating units of Figs. 3 and 4. The machine 50 essentially comprises an elongated tubular housing 51 mounted in a substantially horizontal position, the housing 51 being illustrated in longitudinal section and being substantially rectangular in lateral section, and defining a corresponding elongated chamber 52 therein. The front end of the housing 51 is provided with an opening 53 communicating with the front end of the chamber 52 and carries a hinged front door 54 selectively movable between open and closed positions with respect to the front opening 53; whereby the assembly 40, shown in Fig. 8, may be readily placed into the chamber 52 through the front opening 53 when the front door 54 occupies its open position. When an assembly 40 is placed in the chamber 52, the unsealed end thereof is first inserted into the front opening 53, and then the assembly 40 is pushed forwardly fully into the chamber 52, and ultimately the front door 54 is moved into its closed position. Also when the front door 54 occupies its closed position, it is appropriately sealed to the front end of the housing 51 in order hermetically to seal the front opening 53.

The rear end of the housing 51 terminates in structure 55 including lower and upper tubular extension 56 and 57 respectively carrying lower and upper electrodes 58 and 59; and also the structure defines a compartment 60 disposed adjacent to the inner ends of the electrodes 58 and 59 and provided with a transparent end wall 61 accommodating observation from the exterior of the interior of the compartment 60, as well as the rear end of the chamber 52. In the arrangement, the electrode 58 comprises a stationary electrode mounted within the tubular extension 57 and sealed in place in insulated relation with respect thereto by an associated insulator 62. On the other hand, the electrode 59 comprises a movable electrode slidably mounted within the tubular extension 57 and electrically connected to the structure 51 by an associated flexible pigtail conductor 63. The upper end of the tubular extension 57 terminates in a flange 64 to which a cover plate 65 is secured; and the electrode 59 is mounted upon a stem 66 extending to the exterior through an associated sealed opening provided in the cover plate 65. The extreme upper end of the stem 66 carries an armature 67 provided with an associated solenoid 68; and the movable electrode 59 is biased upwardly away from the stationary electrode 58 by a coil spring 69 acting between the stem 66 and the cover plate 65.

Accordingly, it will be understood that the rear end of the chamber 52 communicates with the compartment 60 and that the rear end of the housing 61 is hermetically sealed by the structure 55. Moreover the stationary electrode 58 is electrically insulated from the housing 51, while the movable electrode 59 is electrically connected to the housing 51. Further, the movable electrode 59 is arranged above and in alignment with the stationary electrode 58 and the movable electrode 59 is biased upwardly away from the stationary electrode 58 by the coil spring 69. However, when the solenoid 68 is energized, the armature 67 is actuated moving the stem 66 downwardly against the bias of the coil spring 69, so that the movable electrode 59 is moved downwardly into engagement with the stationary electrode 58. Of course, when the solenoid 68 is subsequently deenergized, the armature 67 is released so that the coil spring 69 returns the movable electrode 59 upwardly away from the stationary electrode 58.

The compartment 60 communicates with the inner end of a manifold 70, the outer end of which is branched to provide three arms 71, 72 and 73, respectively, including three solenoid controlled valves 74, 75 and 76. The outer end of the arm 71 communicates with the atmosphere, and the valve 74 therein is normally biased into its open position, so that it is operated into its closed position only upon energization of its associated solenoid. The outer end of the arm 72 communicates with the intake port of a vacuum pump 77, and the valve 75 therein is normally biased into its open position, so that it is operated into its closed position only upon energization of its associated solenoid. The outer end of the arm 73 communicates with a cylinder 78 containing a supply of "Freon F12" (dichloro-difluoromethane) under pressure, and the valve 76 therein is normally biased into its closed position, so that it is operated into its open position only upon energization of its associated solenoid. Also a pressure regulator 79 is provided in the arm 73 between the valve 76 and the cylinder 78, so that when the valve 76 occupies its open position, the pressure of the "F12" supplied into the manifold 70 is at a maximum pressure of 730 mm. ±1 mm. mercury. Also the discharge port of the vacuum pump 77 is connected to a conduit 80 that communicates with the atmosphere; and also the vacuum pump 77 is provided with an operating shaft 81 that is driven by an associated electric drive motor 82.

Two electric heating units 83 and 84 are operatively associated with the housing 51, and are interconnected by an associated thermostatic switch 85 that is operatively associated with the housing 51 and arranged to maintain the temperature of the chamber 52 at 120° F. ±5° F. Further, a motor 86 is operatively associated with the housing 51 and provided with a cylinder housing an associated reciprocating piston, not shown. The cylinder of the motor 86 is provided with an intake port connected to a compressed air supply pipe 87 and a discharge port connected to a conduit 88 communicating with the atmosphere; while the piston of the motor 86 is provided with a plunger 89 operatively associated with the lower rear portion of the front door 54. Also a solenoid operated valve 90 is arranged in the pipe 87 and normally biased into its closed position, the valve 90 being operated into its open position only when its associated solenoid is energized. When the valve 90 is operated into its open position, the compressed air from the pipe 87 is supplied into the cylinder of the motor 86, so that the piston thereof moves the plunger 89 forwardly to strike the door 54 moving the same into its open position. Subsequently, when the valve 90 is returned into its closed position, the compressed air escapes from the cylinder of the motor 86 via the conduit 88 to cause the piston thereof to move the plunger 89 backwardly away from the door 54.

Further, the machine 50 comprises a source of power supply of the 3-wire Edison type of 230 volts single-phase A.-C., including two outside conductors 91 and 92 and a grounded neutral conductor 93; and the housing 51 is grounded by connection to the grounded neutral conductor 93. Also the control circuit for the machine 50 comprises a line relay 94 provided with two contact bridging members 95 and 96, a pick-up relay 97 provided with a contact bridging member 98, a seal relay 100 provided with two contact bridging members 101 and 102, a master switch 103, a cycle start switch 104 and a high voltage and high frequency generator 105. The generator 105 may be of the vacuum-tube type, including a pair of filament supply terminals respectively connected to the neutral conductor 93 and to a supply conductor 106, a pair of plate supply terminals respectively connected to two conductors 107 and 108, as well as a pair of high voltage output terminals respectively connected to the neutral conductor 93 and to a conductor 109. Accordingly, the conductor 109 is at high potential (about 20,000 volts) with respect to ground potential of the neutral conductor 93 and the housing 51, when the generator 105 is operated; and the conductor 109 is connected to the electrode 58 so as to impress the high potential mentioned between the electrodes 58 and 59, when the generator 105 is operated.

The drive motor 82 is provided with a pair of terminals respectively connected to the supply conductor 106 and to a conductor 110; the outer terminal of the heating unit 83 is connected to the conductor 110 and the inner terminal thereof is connected to one terminal of the thermostatic switch 85; the outer terminal of the heating unit 84 is connected to the supply conductor 106 and the inner terminal thereof is connected to the other terminal of the thermostatic switch 85; one contact of the master switch 103 is connected to the line conductor 92 and the other contact thereof is connected to a conductor 111; and the two contacts of the cycle start switch 104 are respectively connected to two conductors 112 and 113. Also, an interlock switch 114 is operatively associated with the front door 54 and the contacts thereof are respectively connected to the supply conductor 106 and to a conductor 115.

The pair of contacts associated with the bridging member 101 are respectively connected to the line conductor 91 and to the conductor 108; the pair of contacts associated with the bridging member 102 are respectively connected to the line conductor 92 and to the conductor 107; the pair of contacts associated with the bridging member 95 are respectively connected to the line conductor 92 and to the supply conductor 106; the pair of contacts associated with the bridging member 96 are respectively connected to the line conductor 91 and to the conductor 110; and the pair of contacts associated with the bridging member 98 are respectively connected to the supply conductor 106 and to the conductor 112. The winding of the line relay 94 is bridged across the neutral conductor 93 and the conductor 111; the winding of the pickup relay 97 is bridged across the conductor 112 and a conductor 116; the winding of the seal realy 100 is bridged across the neutral conductor 93 and a conductor 117; and the solenoid 68 is bridged across the neutral conductor 93 and the conductor 117. The solenoid of the valve 74 is bridged across the neutral conductor 93 and a conductor 118; the solenoid of the valve 75 is bridged across the neutral conductor 93 and a conductor 119; the solenoid of the valve 76 is bridged across the neutral conductor 93 and a conductor 120; and the solenoid of the valve 90 is bridged across the neutral conductor 93 and a conductor 121.

Further, the machine 50 comprises a program controller 130 provided with a rotatably mounted fly-back shaft 131 carrying seven insulating control cams C1 to C7, inclusive, respectively operatively associated with seven sets of switch springs S1 to S7, inclusive. The fly-back shaft 131 is biased into its normal or begin position by a helical coil spring 132, and as established by a movable stop 133 carried by the control cam C6 and cooperating with a stationary stop 134 exteriorly supported. Also, the program controller 130 includes an electric timer motor 135 of the synchronous type, preferably a "Telechron" timer motor provided with an operating shaft 136 that is rotated at a speed of 1 r.p.m. when the motor 135 is operated. The shafts 131 and 136 are arranged in longitudinal alignment with each other and terminate the respective clutch plates of an associated magnetic clutch 137 provided with an operating solenoid 138. The clutch plates of the clutch 137 are normally biased into disengagement and are moved into engagement upon energization of the solenoid 138; and in the arrangement the shaft 136 may be rotated in the clockwise direction, thereby effecting corresponding clockwise rotation of the fly-back shaft 131 when the clutch 137 occupies its clutched position. Subsequently, when the clutch 137 is returned into its normal declutched position, the fly-back shaft 131 is released from the timer shaft 136; whereby it is returned by the helical spring 132 in the counterclockwise position back into its begin position, as established by the stops 133 and 134.

The terminals of the timer motor are bridged across the neutral conductor 93 and the conductor 112; and the terminals of the solenoid 138 are bridged across the neutral conductor 93 and the conductor 112. The springs of the set S1 are respectively connected to the conductors 119 and 112; the springs of the set S2 are respectively connected to the conductors 120 and 112; the springs of the set S3 are respectively connected to the conductors 118 and 112; the springs of the set S4 are respectively connected to the conductors 117 and 112; the springs of the set S5 are respectively connected to the conductors 121 and 112; the springs of the set S6 are respectively connected to the conductors 115 and 113; and the springs of the set S7 are respectively connected to the neutral conductor 93 and to the conductor 116.

Considering now the mode of operation of the machine 50, in manufacturing the heat-insulating units 20 illustrated in Figs. 3 and 4, the assemblies 40 are first produced in the manner previously explained and illustrated in Fig. 8; whereupon the assemblies 40 are brought to the machine 50 for the filling and sealing operations. The operator initiates operation of the machine 50 by closing the master switch 103, thereby effecting operation of the line relay 94, whereby the line conductors 91 and 92 are respectively connected to the conductors 110 and 106, so as to bring about operation of the drive motor 82 and heating of the heating units 83 and 84. At this time, the drive motor 82 operates the vacuum pump 77; however, without effect, since the valve 74 occupies its open position. Also the connection of power to the supply conductor 106 brings about heating of the filaments of the tube, not shown, incorporated in the high voltage generator 105; whereby the generator 105 is conditioned for subsequent operation. Moreover the heating units 83 and 84 heat the chamber 52 to the desired temperature, and the thermal switch 85 is selectively operated between its closed and open positions so as to maintain the desired temperature of the chamber 52.

In order to effect filling and sealing of the bag of one of the assemblies 40 of the construction shown in Fig. 8, the operator first opens the door 54 and places the assembly into the chamber 52 sliding the same forwardly so that the unsealed front end thereof is projected between the electrodes 58 and 59, the extreme front end of the bag projecting into the compartment 50. The operator may verify the proper positioning of the assembly within the chamber 52 by viewing the same through the transparent end wall 61 carried by the structure 55. At this time, the door 54 is closed so that the interlock switch 114 is closed. Also it is assumed that the fly-back shaft 131 of the program controller 130 occupies its normal begin position, whereby each of the sets of switch springs S1 to S5, inclusive, occupies its open position, and each of the set of switch springs S6 and S7 occupies its closed position.

At this time, the operator momentarily closes the cycle start switch 104; whereby a start circuit is completed for energizing the winding of the pickup relay 97; this circuit extending from the supply conductor 106 via the closed interlock switch 114, the conductor 115, the closed set of switch springs S6, the closed cycle start switch 104, the conductor 112, the winding of the pickup relay 97, the conductor 116 and the closed set of switch springs S7 to the neutral conductor 93. Accordingly, the pickup relay 97 operates closing the contact bridging member 98 to provide a direct stick circuit around the cycle start switch 104, the set of switch springs S6 and the interlock switch 114, for energizing the winding thereof; whereby the pickup relay 97 is retained in its operated position subsequent to the release of the cycle start switch 104. Also, upon operating the pickup relay 97 completes at the contact bridging member 98 a connection between the supply conductor 106 and the conductor 112; whereby both the timer motor 135 and the solenoid 138 of the clutch 137 are energized. Hence the timer motor 135 operates to rotate the shaft 136 in the clockwise direction at the timed rate of 1 r.p.m.; and the clutch 137 is operated into its clutched position so that the fly-back shaft 131 is clutched to the drive shaft 136 and is rotated therewith at the rate of 1 r.p.m.

First omitting the details of the controls that are brought about in the cycle of the fly-back shaft 131, it is noted that when the control cam C6 is rotated out of its normal begin position, the set of switch springs S6 is opened, thereby to disable the cycle start switch 104; and as the fly-back shaft 131 is rotated in the clockwise direction out of its begin position, the stop 133 is displaced from the stop 134 and energy is stored in the helical spring 132. At the conclusion of the cycle of the fly-back shaft 131, the control cam C7 operates the set of switch springs S7 into its open position, thereby interrupting the stick circuit for energizing the winding of the pickup relay 97, so that the latter relay restores. Upon restoring the pickup relay 97 opens the contact bridging member 98 so as to disconnect the conductor 106 from the conductor 112, thereby interrupting a further point in the stick circuit for energizing the winding of the pickup relay 97. Also when power is thus removed from the conductor 112, the timer motor 135 is deenergized so that operation thereof is arrested, and the solenoid 138 is deenergized so that the clutch 137 is returned into its normal declutched position. When the fly-back shaft 131 is thus declutched from the timer shaft 136, the helical spring 132 returns the fly-back shaft 131 in the counter-clockwise direction back into its begin position as established by the cooperation between the stops 133 and 134; whereby the control cams C6 and C7 respectively close the sets of switch springs S6 and S7. At this time, the cycle of the machine 50 has been completed and the control circuit is in condition for recycling the same.

Figure 10:
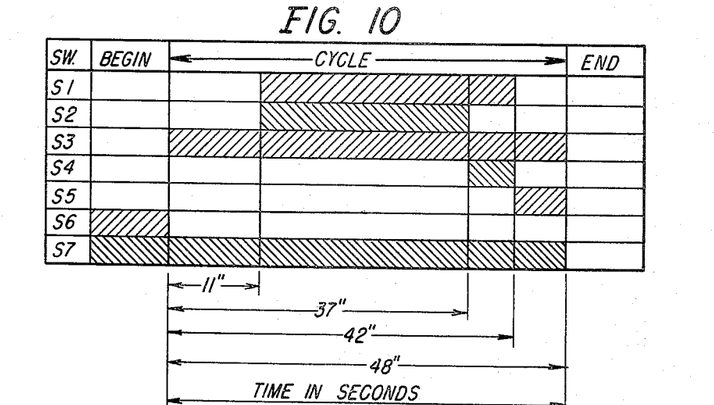
Fig. 10 is a time-sequence diagram of the steps involved in the cycle of operation of the machine of Fig. 9.

Considering now in greater detail the cycle of the fly-back shaft 131 in response to operation of the clutch 137 into its clutched position, reference is made to the timed sequence diagram of Fig. 10. When the fly-back shaft 131 is operated out of its begin position into its cycle position, the set of switch springs S6 is opened by the control cam C6, as previously noted; and also the set of switch springs S3 is operated into its closed position by the control cam C3. Closure of the set of switch springs S3 completes a circuit for energizing the solenoid of the valve 74; whereby this valve is operated into its closed position, so that the operating vacuum pump exhausts the air from the manifold 70 with the result that the pressure in the compartment 60 and consequently in the chamber 52 is substantially reduced; whereby the air in the assembly 40, as a whole, is exhausted. As time proceeds, the pressure in the chamber 52 is reduced to or below 5 mm. of mercury; whereby a substantial vacuum thus results in the chamber 52 in order that substantially all of the air contained in the assembly 40 is removed therefrom. Specifically, the air is removed from the bag and also from the enclosed bat of glass fibers; however, the bag of the assembly 40 does not collapse by virtue of the fact that the pressure both inside and outside thereof and within the chamber 52 and the compartment 60 is at a substantially uniform pressure of about 5 mm. of mercury, as previously noted.

This exhausting step proceeds throughout a time interval of 11 seconds as illustrated in Fig. 10; whereupon the sets of switch springs S1 and S2 are closed by the respective control cams C1 and C2. Closure of the set of switch springs S1 completes a circuit for energizing the solenoid of the valve 75; whereby this valve is operated into its closed position to disconnect the manifold 70 from the vacuum pump 77. Closure of the set of switch springs S2 completes a circuit for energizing the solenoid of the valve 76; whereby this valve is operated into its open position to connect the manifold 70 to the cylinder 78 so that the gaseous "F12" is supplied via the pressure regulator 79 into the manifold 70 and consequently into the compartment 60 and the communicating chamber 52, bringing about filling of the interior of the bag of the assembly 40 and permeation of the bat of glass fibers with the "F12." The pressure regulator 79 is set to maintain a pressure in the manifold 70 of about 730 mm.±1 mm. mercury; whereby the resulting pressure of the "F12" in the chamber 52 is still somewhat below atmospheric pressure so that the resulting differential pressure upon the door 54 maintains the same in its closed position. Also it is mentioned that the admission of the "F12" into the chamber 52 does not effect the collapse of the bag of the assembly 40, since the pressure within and without the bag, and within the chamber 52, is substantially uniform at the pressure of about 730 mm. mercury, as previously noted.

The pressure is maintained throughout a time interval of 26 seconds so as thoroughly to permeate the bat of glass fibers of the assembly 40; whereupon the set of switch springs S2 is operated into its open position by the control cam C2 and set of switch springs S4 is operated into its closed position by the control cam C4, as indicated in Fig. 10. Opening of the set of switch springs S2 interrupts the previously mentioned circuit for energizing the solenoid of the valve 76; whereby this valve is returned into its closed position disconnecting the manifold 70 from the cylinder 78, so as to interrupt the supply of "F12" to the manifold 70. Closure of the set of switch springs S4 completes a circuit for energizing the winding of the seal relay 100 and a multiple circuit for energizing the solenoid 68. Accordingly, the seal relay 100 is operated so that the contact bridging members 101 and 102 respectively connect the line conductors 91 and 92 to the conductors 108 and 107 in order that the plate circuit of the generator 105 is supplied with power, bringing about the application of high voltage between the conductor 109 and the neutral conductor 93 and the consequent application of high voltage between the electrodes 58 and 59. Energization of the solenoid 68 brings about operation of the associated armature 67; whereby the electrode 59 is moved downwardly toward the electrode 58 with the result that the front end of the bag is clamped between the electrodes 58 and 59, while high potential is applied between the electrodes 58 and 59; whereby the open front end of the bag is closed and heat-sealed, the materials of the bag being fused and heat-sealed, as previously explained, by virtue of the heat developed therein in clamped position between the electrodes 58 and 59 due to the high voltage between these electrodes.

This sealing step is continued for a time interval of 5 seconds as indicated in Fig. 10; whereupon the sets of switch springs S1 and S4 are opened by the respective control cams C1 and C4, and the set of switch springs S5 is closed by the control cam C5. Opening of the set of switch springs S1 interrupts the previously mentioned circuit for energizing the solenoid of the valve 75, whereby this valve is returned into its open position again connecting the manifold 70 to the vacuum pump 77. Opening of the set of switch springs S4 interrupts the multiple circuits for energizing the winding of the seal relay 100 and the solenoid 68. Accordingly, the seal relay 100 restores, whereby the contact bridging members 101 and 102 disconnect the conductors 108 and 107 from the line conductors 92 and 93, bringing about the interruption of the supply of plate voltage to the generator 105, with the result that the high voltage is removed from the conductor 109 with respect to the neutral line 93, thereby to remove the potential between the electrodes 58 and 59. Deenergization of the solenoid 68 effects the release of the armature 67 so that the spring 69 returns the movable electrode 59 upwardly away from the stationary electrode 58, with the result that the front end of the sealed bag of the unit 20 is released or unclamped from between the electrodes 58 and 59. Closure of the set of switch springs S5 completes a circuit for energizing the solenoid of the valve 90; whereby the latter valve is operated into its open position in order to effect operation of the compressed air motor 86. More particularly, compressed air from the supply pipe 87 enters the cylinder of the motor 86 causing the piston thereof to drive the plunger 89 forwardly into striking engagement with the door 54 with the result that the door 54 is thus operated into its open position. When the door 54 is thus operated into its open position, air enters through the front opening 53 into the chamber 52; whereby the "F12" in the chamber 52 is pushed forwardly therein into the compartment 60 and thence into the manifold 70 and exhausted to the atmosphere by the vacuum pump 77.

This purging step of the "F12" from the chamber 52 continues for a time interval of 6 seconds, as indicated in Fig. 10; whereupon the fly-back shaft 131 is operated into its end position, so that the set of switch springs S7 is opened to bring about the restoration of the pickup relay 97 in order to effect the disconnection of power from the conductor 112. When power is thus removed from the conductor 112, the clutch 137 is operated into its declutched position and operation of the timer motor 135 is arrested; whereby the fly-back shaft 131 is immediately and quickly returned into its begin position, as previously explained. When the fly-back shaft 131 is thus returned into its end position, the sets of switch springs S3 and S5 are operated into their open positions by the respective cams C3 and C5. Opening of the set of switch springs S3 effects deenergization of the solenoid of the valve 74; whereby this valve is returned into its open position so as again to connect the manifold 70 to the atmosphere in order to unload the vacuum pump 77. Opening of the set of switch springs S5 effects deenergization of the solenoid of the valve 90; whereby this valve is returned into its closed position so that the air motor 86 is disconnected from the compressed air supply pipe 87, with the result that the plunger 89 is retracted from engagement with the front door 54.

At this time, the cycle of the machine 50 has been completed and the operator may move the door 54 into its fully open position and effect removal of the completed heat-insulating unit 20 from the chamber 52.

Reconsidering the mode of operation of the control circuit for the machine 50, it will be understood that in order to initiate the cycle, it is only necessary for the operator momentarily to close the cycle start switch 104; however, at this time the interlock switch 114 must occupy its closed position and also the fly-back shaft 131 must occupy its begin position. At any time the operator may arrest the cycle of the machine 50 at any point therein by momentarily opening the master switch 103, so as to effect the restoration of the line relay 94 and the consequent removal of power from the supply conductor 106, with the result that the pickup relay 97 immediately restores, regardless of the position of the fly-back shaft 131 in its cycle. Thereafter the operator may again condition the machine 50 for re-operation by reclosing the master switch 103.

The overall cycle of operation of the machine 50 requires a time interval of 48 seconds, as indicated in the sequence diagram of Fig. 10; moreover, the operator requires about 11 seconds to load the assembly 40 of Fig. 8 into the chamber 52 and about 3 seconds to unload the finished heat insulating unit 20 from the chamber 52; whereby the total time interval required to bring about the production of the finished heat-insulating unit 20 from the assembly 40 of Fig. 8 is about 62 seconds. Accordingly, the machine 50 is operative in a very rapid and simple manner to bring about the filling and sealing of the heat-insulating units 20.

Figure 11:
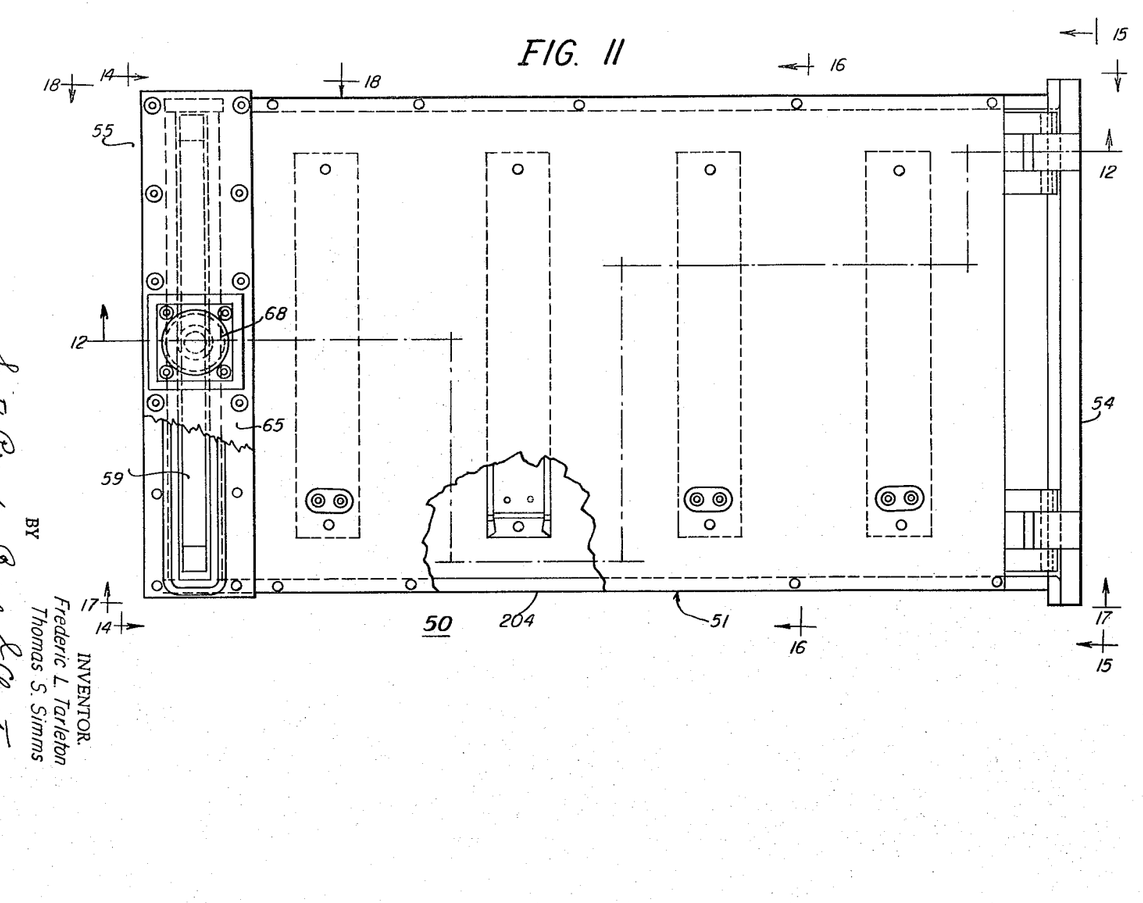
Fig. 11 is a plan view of the machine illustrating certain constructional details thereof.
Figures 12, 18, 19:
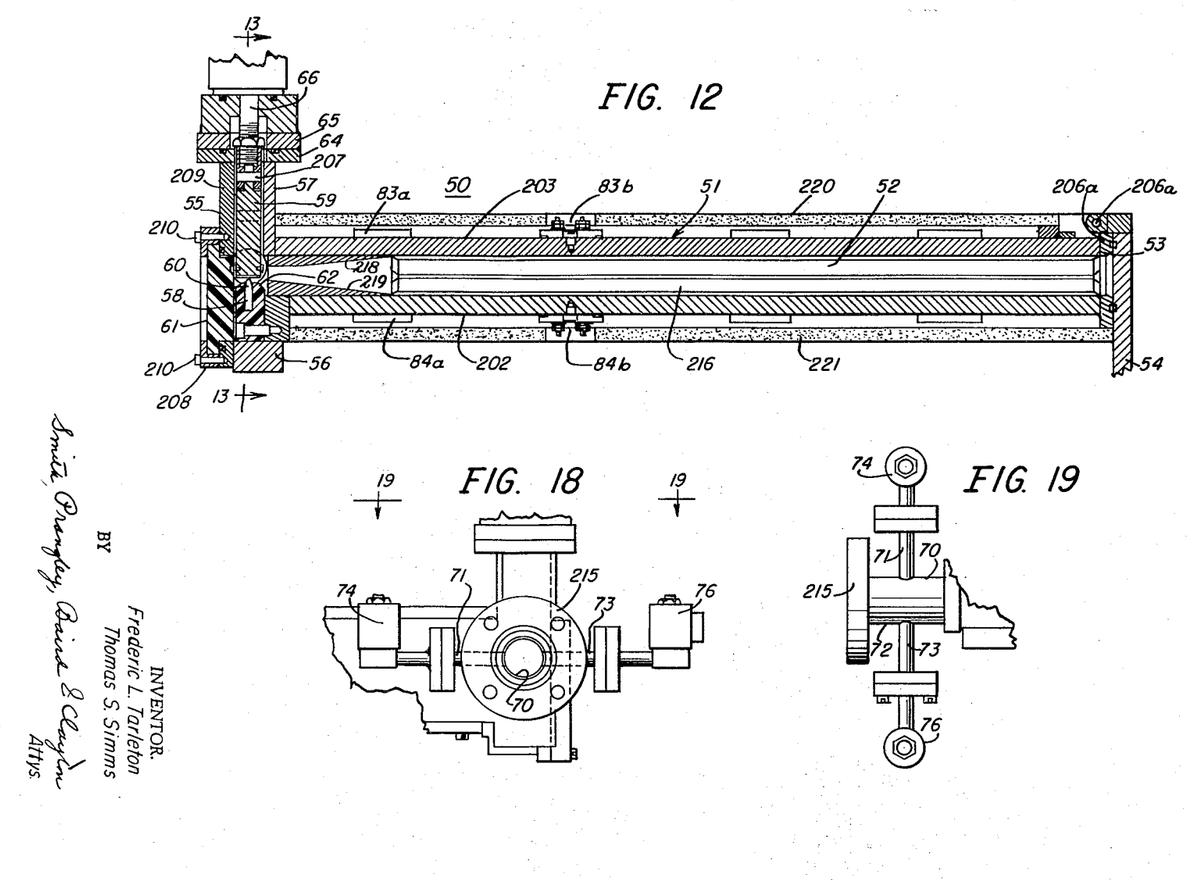
Fig. 12 is a longitudinal sectional view, taken in the direction of the arrows along the offset line 12—12 in Fig. 11.
Fig. 18 is another fragmentary side elevational view, taken in the direction of the arrows along the line 18—18 in Fig. 11.
Fig. 19 is a plan view, taken in the direction of the arrows along the line 19—19 in Fig. 18.
Figure 13:
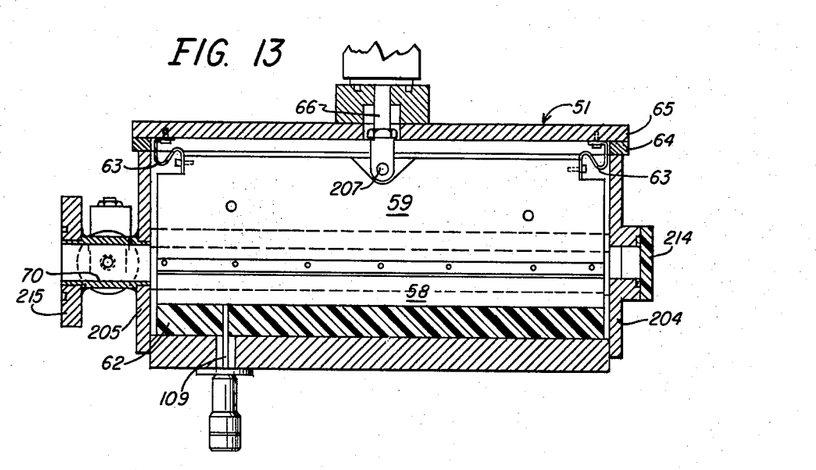
Fig. 13 is a lateral sectional view, taken in the direction of the arrows along the line 13—13 in Fig. 12.
Figure 14:
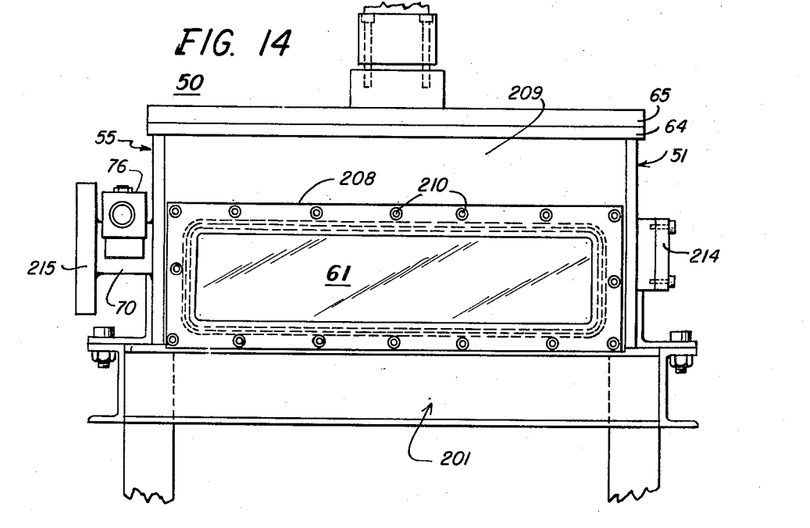
Fig. 14 is a rear elevational view, taken in the direction of the arrows along the line 14—14 in Fig. 11.
Figure 15:
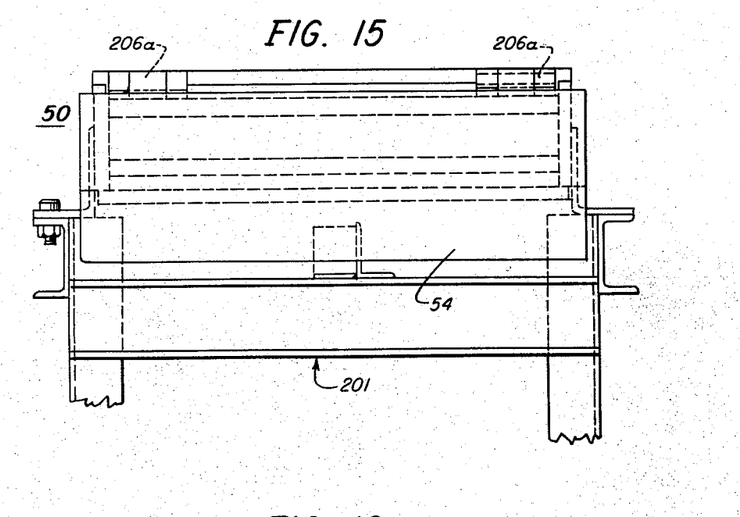
Fig. 15 is a front elevational view, taken in the direction of the arrows along the line 15—15 in Fig. 11.
Figure 16:
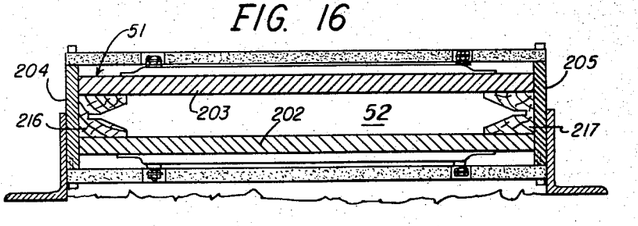
Fig. 16 is a lateral sectional view, taken in the direction of the arrows along the line 16—16 in Fig. 11.
Figures 23, 24:
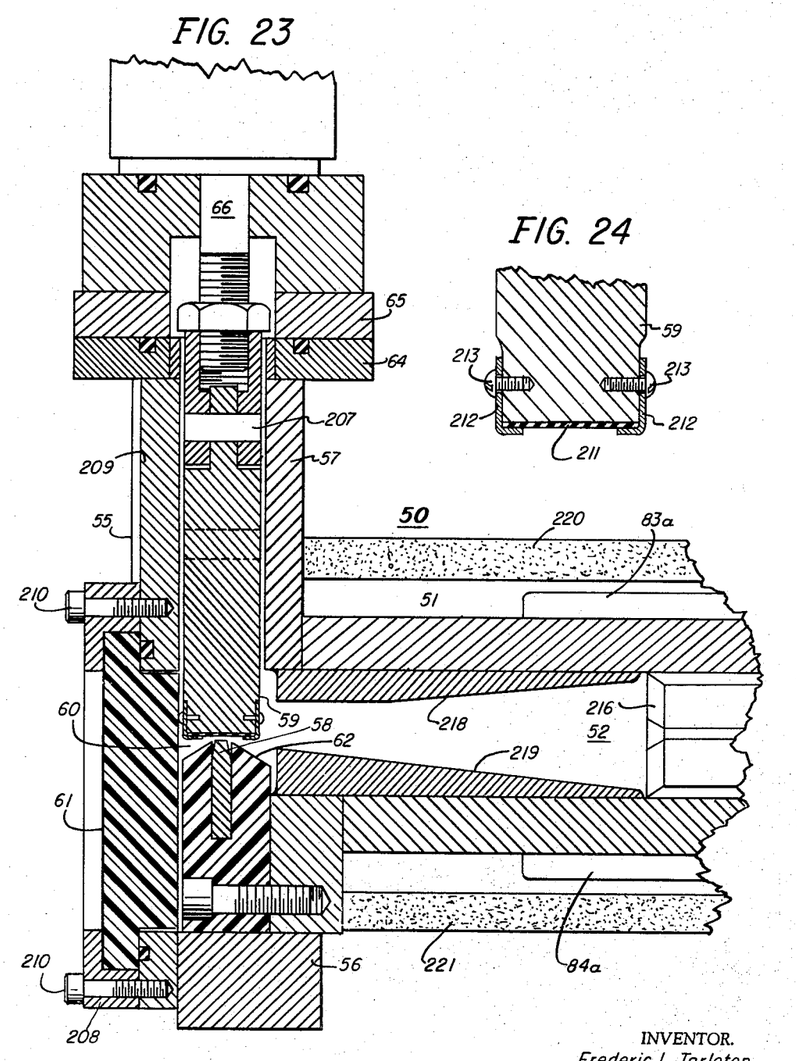
Fig. 23 is an enlarged longitudinal sectional view of the left-hand-most portion of the machine, as shown in Fig. 12.
Fig. 24 is a further enlarged fragmentary detail of an element of the machine, as shown in Fig. 23.

Considering now in greater detail the construction and arrangement of the machine 50 with reference to Figs. 11 to 24, inclusive, of the drawings, and referring particularly to Figs. 11, 14, 15 and 17, it is noted that the machine 50 is mounted in a substantially horizontal position upon supporting structure indicated generally at 201; and as best shown in Figs. 12 and 16, the housing 51 essentially comprises a bottom plate 202, a top plate 203 and a pair of side plates 204 and 205, and defining the elongated chamber 52. The front end of the housing 51 carries a front plate 206 (shown in Fig. 21) having the front opening 53 formed therein and to which the front door 54 is pivotally mounted, as indicated at 206a. As previously explained, the rear end of the housing 51 terminates in the structure 55 including lower and upper tubular extensions 56 and 57 respectively carrying the lower and upper electrodes 58 and 59. As best illustrated in Figs. 12, 13 and 23, the lower stationary electrode 58 is mounted in the cooperating insulator 62 and extends laterally across the rear end of the chamber 52 and cooperates with the movable electrode 59 that also extends laterally across the rear end of the chamber 52. The movable electrode 59 is secured adjacent to the central portion thereof to the stem 66 by a pivot pin 207 and the stem 66 projects through the opening provided in the cover plate 65 that is secured to the top flange 64 (see Fig. 22), the opposite sides of the movable electrode 59 being electrically connected to the cover plate 65 by the pigtails 63, as shown in Fig. 13. Also the stationary electrode 58 is connected to the conductor 109 that extends to the exterior, as shown in Fig. 13.

Figure 20:
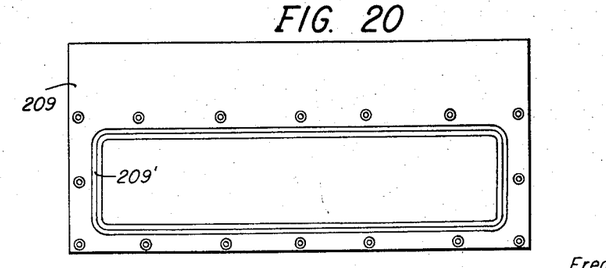

The extreme rear end of the structure 55 carries the transparent window 61 closing the adjacent compartment 60, the window 61 being preferably formed of methylmethacrylate resin, and being retained in place by an associated substantially rectangular frame 208 that is secured to the associated end wall 209 of the structure 55 by suitable screws 210, the end wall 209 being substantially rectangular in plan, as illustrated in Fig. 20. Of course, the window 61 permits the operator to view from the exterior the compartment 60 the adjacent electrodes 58 and 59, and the rear end of the chamber 52.

As best shown in Figs. 23 and 24, the extreme lower end of the movable electrode 59 is covered by a layer 211 of electrical insulation that may take the form of a strip of methylmethacrylate that is secured in place by a pair of metallic clamping plates 212 and associated screws 213. In the arrangement, when the movable electrode 69 is thrust downwardly into engagement with the stationary electrode 58, so as to clamp the unsealed end of the bag of the assembly 40 therebetween, the insulating strip 211 directly engages the bag serving as a clamping plate. Also the insulating strip 211 positively insures that the movable electrode 59 does not directly electrically engage the stationary electrode 58, in the event there is no bag therebetween when the electrode 59 is moved downwardly toward the electrode 58, thereby to prevent the possibility of a short-circuit upon the associated generator 105. Of course, it will be understood that by virtue of the application of the high voltage between the electrodes 58 and 59, the insulating material of the bag of the assembly 40 is subjected to the high frequency electric field so as to effect heating thereof and the consequent fusion and hermetic sealing of the adjacent end of the bag of the assembly 40, in the manner previously explained.

Referring now to Figs. 13, 14, 17, 18 and 19, an opening is provided in the rear end of the side wall 205 into which the inner end of the manifold 70 is hermetically secured; and an aligned opening is provided in the rear end of the side wall 204 to which a transparent window 214 formed of methylmethacrylate, or the like, is secured. More particularly, the inspection-window 214 is arranged in horizontal alignment with the manifold 70, as viewed in Figs. 13 and 14, and also in substantial alignment with the electrodes 58 and 59 so that the compartment 60 and the rear end of the chamber 52 may be viewed through both of the windows 61 and 214. The outer end of the manifold 70 comprises the arm 72 carrying the flange 215 that is connectible to the vacuum pump 77, as previously explained. Also, the manifold 70 is provided with the two arms 71 and 73 is in which the valves 74 and 76 are respectively arranged, as best shown in Figs. 18 and 19.

Referring to Figs. 12, 16 and 23, a pair of laterally spaced-apart and longitudinally extending wooden guide blocks 216 and 217 are arranged within the chamber 52 respectively adjacent to the side plates 204 and 205; which guide blocks 216 and 217 serve to receive the opposite sides of the assembly 40 so as to insure proper forward sliding movement thereof in order that the unsealed end of the bag of the assembly 40 is moved between the electrodes 58 and 59, as previously explained. Also the blocks 216 and 217 serve as fillers to reduce the volume of the chamber 52 so as to minimize the volume thereof, thereby minimizing both the amount of air that must be evacuated from the chamber 52 and the amount of "F12" that must be purged from the chamber 52 in the operation of the machine 50, as previously explained. Also for the purpose of insuring guiding of the unsealed end of the bag of the assembly 40, two tapered laterally extending steel plates 218 and 219 are respectively secured to the top plate 203 and to the bottom plate 202 adjacent to the electrodes 58 and 59 and forwardly thereof, as best shown in Figs. 12 and 23. The laterally extending guide plates 218 and 219 are also positioned adjacent to the ends of the longitudinally extending guide blocks 216 and 217, thereby positively to insure proper directing and guiding of the throat section of the open end of the bag of the assembly 40 between the electrodes 58 and 59.

As previously described in conjunction with Fig. 9, the housing 51 is heated by a pair of heating units 83 and 84 which heating units are respectively carried by the top plate 203 and by the bottom plate 202, as shown in Figs. 11 and 12. In the arrangement, the heating unit 83 may comprise four laterally extending sections 83a, 83b, etc., arranged in longitudinally spaced-apart relation upon the exterior surface of the top plate 203; and similarly, the heating unit 84 may comprise four laterally extending sections 84a, 84b, etc., arranged in longitudinally spaced-apart relation upon the exterior surface of the bottom plate 202. Also in the arrangement, the heating unit 83 is covered by a top insulating plate 220 disposed above the top plate 203 of the housing 51, and the heating unit 84 is covered by a bottom insulating plate 221 disposed below the bottom plate 202 of the housing 51. The insulating plates 220 and 221 may be formed of any suitable insulating material, such, for example, as "lava"; whereby the heat generated by the heating units 83 and 84 is directed inwardly toward the walls 203 and 202 of the housing 51 and consequently toward the chamber 52 for the useful purpose of heating the charge of "F12" in the chamber 52 incident to filling the assembly 40, as previously explained.

Figures 17, 21, 22:
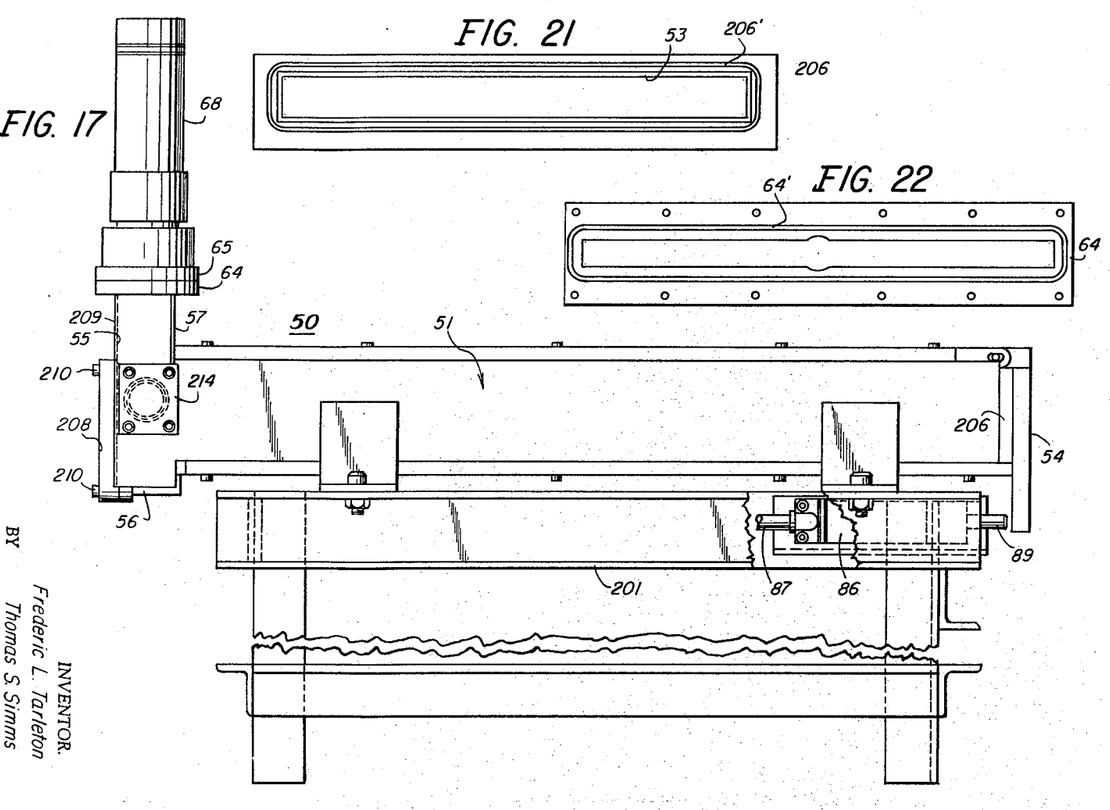
Fig. 17 is a side elevational view, taken in the direction of the arrows along the line 17—17 in Fig. 11.
Figs. 20, 21 and 22 are plan views of certain component elements of the machine.

As shown in Fig. 17, the compressed air motor 86 that is provided with the plunger 89 that cooperates with the front door 54 can be conveniently carried directly upon the support 201, the casing of the motor 86 being connected to the compressed air supply pipe 87, as indicated. As best illustrated in Fig. 21, the front plate 206 that cooperates with the front door 54 and that has the front opening 53 therein communicating with the front end of the chamber 52 is provided with an annular groove 206' therein that receives a suitable gasket for the purpose of effecting an hermetic seal with the front door 54 in its closed position. As best illustrated in Fig. 22, the flange 64 that cooperates with the top plate 65 is provided with an annular groove 64' therein that receives a suitable gasket for the purpose of effecting an hermetic seal with the top plate 65. As best illustrated in Fig. 20, the plate 209 that cooperates with the window 61 is provided with an annular groove 209' therein that receives a suitable gasket for the purpose of effecting an hermetic seal with the window 61. In conclusion, it is noted that many of the structural details of the machine 50, while fully illustrated in Figs. 11 to 24, inclusive, of the drawings, have not been described with particularity in the interest of brevity.

In the heat-sealing step of the foregoing method, the marginal edges of the two sheets 21a and 21b of the bag of the unit 20 are subjected to heat and pressure therethrough, so that the inner plies 27 and 28 of the two sheets in facing relation with each other fuse and bond together, producing the seal indicated at 23, about the perimeter of the bag. In this step, the paper plies 25 of the two sheets absorb with their resilient thickness the variation in the thickness of the Saran plies 27 and 28 in the two sheets, as well as other sources of misalignment, thereby eliminating microscopic bridges through the welds and unfused areas in the welds. More particularly, these paper plies effect a more uniform pressure along the entire length of the seam in fusing the liquid interfaces. Moreover, these paper plies distribute some of the force of the sealing electrodes laterally, so that the plastic material adjacent to the weld zone is compressed, thereby preventing excessive upsetting of the plastic material. This materially improves the tear resistance of the plastic material adjacent to the weld and prevents any reduction in thickness through which excessive permeation might occur. Hence, the important structural advantages of the bag of the unit 20 flow not only from the individual elements or plies of the sheets thereof, but also from the cooperation therebetween and from the essentially new characteristics imparted to the plastic plies by the paper plies, both in the final structure of the bag and in the fabricating steps described.

In the foregoing method, the assembly of the self-supporting deformable porous slab of solid poor heat-conducting material and the enclosing flexible bag is made, and then the assembly is placed in the open chamber 52; whereupon the chamber 52 is closed from the atmosphere and then evacuated to produce an air pressure therein of about 5 mm. of mercury, simultaneously with the heating thereof to a temperature of about 120° F. This arrangement insures the removal of a very high proportion of the air from the closed chamber 52 and from the assembly enclosed therein, the relatively high temperature mentioned being effective to eliminate occluded air from the slab of poor heat-conducting material, that is normally formed of glass fibers. Next, gaseous "F12" is introduced into the closed chamber 52 to produce a gas pressure therein of about 730 mm. of mercury, simultaneously with the heating thereof to the temperature of about 120° F., thereby to insure filling of the closed chamber 52 and both enveloping and filling of the assembly enclosed therein with the gaseous "F12." Subsequently, the opening into the flexible bag of the assembly is hermetically sealed, while the assembly is in the closed chamber 52 and is both enveloped and filled with the gaseous "F12" therein, so as to trap a charge of the gaseous "F12" in the sealed bag. Thereafter, the chamber 52 is opened to the atmosphere and purged of the residual "F12" therein after the sealing of the flexible bag of the assembly, as noted above, and then the finished heat-insulating unit is removed from the open chamber 52. The sealing of the charge of gaseous "F12" in the flexible bag of the heat-insulating unit at the pressure of about 730 mm. of mercury at the temperature of about 120° F., insures a partial vacuum therein when the flexible bag of the unit is subsequently subjected in use to atmospheric pressure (760 mm. of mercury) and to an ambient temperature in the previously mentioned relatively wide range (−30° F. to +150° F.).

In view of the foregoing, it is apparent that there has been provided an improved machine for manufacturing the heat-insulating units described in a simple and economical manner and on a mass production basis.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A machine for making a heat-insulating unit comprising structure defining a chamber having a doorway thereinto, a door cooperating with said doorway and movable between open and closed positions with respect thereto, said chamber being adapted to receive through said doorway with said door in its open position an assembly including a self-supporting deformable porous slab of solid poor heat-conducting material and an enclosing flexible bag having an opening in one end thereof and formed of material that may be readily sealed by application thereto of heat and pressure, a pair of relatively movable electrodes arranged in said chamber and normally disposed in spaced-apart relation and arranged to receive therebetween the end of the bag having the opening therein when the assembly is placed in said chamber, a vacuum pump, a first valve for selectively connecting and disconnecting said chamber with respect to said vacuum pump, a container for a supply of gas under pressure and having a coefficient of thermal conductivity lower than that of air, a second valve for selectively connecting and disconnecting said chamber with respect to said container, a motor for moving said electrodes toward engagement, a generator for applying a potential between said electrodes, a program controller, first means governed by said program controller while said door is in its closed position for selectively operating said first and second valves so that first the air is removed from said chamber and from the assembly therein and so that then the gas is admitted to fill said chamber and the assembly therein, second means governed by said program controller while said chamber and the assembly are filled with the gas for operating said motor to move said electrodes toward engagement so as to clamp the adjacent end of the bag therebetween, and third means governed by said program controller while said electrodes are in clamped position for operating said generator to apply a potential between said electrodes so as to effect hermetic sealing of the clamped end of the bag in order to trap a charge of the gas in the sealed bag.

2. A machine for making a heat-insulating unit comprising structure defining a chamber having a doorway thereinto, a door cooperating with said doorway and movable between open and closed positions with respect thereto, said chamber being adapted to receive through said doorway with said door in its open position an assembly including a self-supporting deformable porous slab of solid poor heat-conducting material and an enclosing flexible bag having an opening in one end thereof and formed of material that may be readily sealed by application thereto of heat and pressure, a pair of relatively movable electrodes arranged in said chamber and normally disposed in spaced-apart relation and arranged to receive therebetween the end of the bag having the opening therein when the assembly is placed in said chamber, a vacuum pump, a first valve for selectively connecting and disconnecting said chamber with respect to said vacuum pump, a container for a supply of gas under pressure and having a coefficient of thermal conductivity lower than that of air, a second valve for selectively connecting and disconnecting said chamber with respect to said container, a first motor for moving said electrodes toward engagement, a generator for applying a potential between said electrodes, a second motor for moving said door from its closed position to its open position, a program controller, first means governed by said program controller while said door is in its closed position for selectively operating said first and second valves so that first the air is removed from said chamber and from the assembly therein and so that then the gas is admitted to fill said chamber and the assembly therein, second means governed by said program controller while said chamber and the assembly are filled with the gas for operating said first motor to move said electrodes toward engagement so as to clamp the adjacent end of the bag therebetween, third means governed by said program controller while said electrodes are in clamped position for operating said generator to apply a potential between said electrodes so as to effect hermetic sealing of the clamped end of the bag in order to trap a charge of gas in the sealed bag, and fourth means governed by said program controller subsequent to sealing of the bag for reoperating said first and second valves so that said chamber is disconnected from said container and reconnected to said vacuum pump and for operating said second motor to move said door from its closed position into its open position, whereby the residual gas in said chamber is purged therefrom.

3. The machine set forth in claim 2, wherein said program controller is operative through a predetermined cycle in a given time interval so that said first and second and third and fourth means are governed in the sequence set forth and during corresponding portions of said cycle.

4. A machine for making a heat-insulating unit comprising structure defining a chamber having a doorway thereinto, a door cooperating with said doorway and movable between open and closed positions with respect thereto, said open chamber being adapted to receive through said doorway an assembly including a flexible bag having an opening thereinto and a self-supporting deformable porous slab of solid poor heat-conducting material enclosed in the bag, a program controller, first means governed by said program controller while said door is in its closed position for evacuating said closed chamber so as to remove the air therefrom and from the assembly therein, second means governed by said program controller then for introducing a gas having a coefficient of thermal conductivity lower than that of air into said closed chamber so as to fill the same and both to envelope and to fill the assembly therewith, sealing mechanism arranged in said chamber and operative hermetically to seal the opening into the bag while the assembly is in said closed chamber and is both enveloped and filled with the gas therein so as to trap a charge of the gas in the sealed bag, and third means governed by said program controller then for operating said sealing mechanism.

5. The machine set forth in claim 4, wherein said evacuating means is arranged to produce an air pressure in said closed chamber that is less than 10 mm. of mercury, and said gas introducing means is arranged to produce a gas pressure in said chamber that is somewhat less than 760 mm. of mercury.

6. A machine for making a heat-insulating unit comprising structure defining a chamber having a doorway thereinto, a door cooperating with said doorway and movable between open and closed positions with respect thereto, said open chamber being adapted to receive through said doorway an assembly including a flexible bag having an opening thereinto and a self-supporting deformable porous slab of solid poor heat-conducting material enclosed in the bag, a program controller, first means governed by said program controller for heating said chamber, means for regulating said heating means to maintain the temperature of said chamber at about 120° F., second means governed by said program controller while said door is in its closed position then for evacuating said closed chamber so as to remove the air therefrom and from the assembly therein, said last-mentioned means being arranged to produce an air pressure in said closed chamber at said temperature of about 5 mm. of mercury, third means governed by said program controller then for introducing a gas having a coefficient of thermal conductivity lower than that of air into said closed chamber so as to fill the same and both to envelope and to fill the assembly therewith, said last-mentioned means being being arranged to produce a gas pressure in said closed chamber at said temperature of about 730 mm. of mercury, sealing mechanism arranged in said chamber and operative hermetically to seal the opening into the bag while the assembly is in said closed chamber and is both enveloped and filled with the gas therein so as to trap a charge of the gas in the sealed bag, and fourth means governed by said program controller for operating said sealing mechanism.

7. A machine for making a heat-insulating unit comprising structure defining a chamber having a doorway thereinto, a door cooperating with said doorway and movable between open and closed positions with respect thereto, said open chamber being adapted to receive through said doorway an assembly including a flexible bag having an opening thereinto and a self-supporting deformable porous slab of solid poor heat-conducting material enclosed in the bag, a vacuum pump, a container for a supply of gas under pressure and having a coefficient of thermal conductivity lower than that of air, a program controller, first means governed by said program controller while said door is in its closed position for connecting first said vacuum pump and thereafter said container to said closed chamber so that first the air is removed from said closed chamber and from the assembly therein and so that thereafter the gas fills said closed chamber and both envelops and fills the assembly therein, sealing mechanism arranged in said chamber and operative hermetically to seal the opening into the bag while the assembly is in said closed chamber and is both enveloped and filled with the gas therein so as to trap a charge of the gas in the sealed bag, and second means governed by said program controller for operating said sealing mechanism.

8. A machine for making a heat-insulating unit comprising structure defining a chamber having a doorway thereinto, a door cooperating with said doorway and movable between open and closed positions with respect thereto, said open chamber being adapted to receive through said doorway an assembly including a flexible bag having an opening thereinto and a self-supporting deformable porous slab of solid poor heat-conducting material enclosed in the bag, a first conduit communicating between said chamber and the atmosphere, a vacuum pump, a second conduit communicating between said chamber and said vacuum pump, a container for a supply of gas under pressure and having a coefficient of thermal conductivity lower than that of air, a third conduit communicating between said chamber and said container, valve mechanism arranged in said three conduits named and selectively operative to open and to close each of said conduits, sealing mechanism arranged in said chamber and operative hermetically to seal the opening into the bag while the assembly is in said closed chamber, a program controller, first means governed by said program controller while said door is in its closed position first for operating said valve mechanism to close said first and third conduits and to open said second conduit so that first the air is removed from said closed chamber and from the assembly therein, second means governed by said program controller then for operating said valve mechanism to close said first and second conduits and to open said third conduit so that then the gas fills said closed chamber and both envelopes and fills the assembly therein, third means governed by said program controller then for operating said sealing mechanism in order hermetically to seal the opening into the bag while the assembly is in said closed chamber and is both enveloped and filled with the gas therein so as to trap a charge of the gas in the sealed bag, and fourth means governed by said program controller then for operating said valve mechanism to close said second and third conduits and to open said first conduit so as to admit air into said closed chamber.

9. A machine for making a heat-insulating unit comprising structure defining a chamber having a doorway thereinto, a door cooperating with said doorway and movable between open and closed positions with respect thereto, said open chamber being adapted to receive through said doorway an assembly including a flexible bag having an opening thereinto and a self-supporting deformable porous slab of solid poor heat-conducting material enclosed in the bag, a program controller, first means governed by said program controller while said door is in its closed position for evacuating said closed chamber so as to remove the air therefrom and from the assembly therein, second means governed by said program controller then for introducing a gas having a coefficient of thermal conductivity lower than that of air into said closed chamber so as to fill the same and both to envelope and to fill the assembly therewith, sealing mechanism arranged in said chamber and operative hermetically to seal the opening into the bag while the assembly is in said closed chamber and is both enveloped and filled with the gas therein so as to trap a charge of the gas in the sealed bag, third means governed by said program controller for operating said sealing mechanism, a motor operative to move said door from its closed position into its open position, and fourth means governed by said program controller and controlled subsequent to operation of said sealing mechanism for operating said motor.

10. A machine for making a heat-insulating unit comprising structure defining a chamber having a doorway thereinto, a door cooperating with said doorway and movable between open and closed positions with respect thereto, said open chamber being adapted to receive through said dooway an assembly including a flexible bag having an opening thereinto and a self-supporting deformable porous slab of solid poor heat-conducting material enclosed in the bag, a vacuum pump, a container for a supply of gas under pressure and having a coefficient of thermal conductivity lower than that of air, a program controller, first means governed by said program controller following movement of said door into its closed position for connecting said closed chamber to said vacuum pump so as to remove the air from said closed chamber and from said assembly therein, second means governed by said program controller then for disconnecting said closed chamber from said vacuum pump and for connecting said closed chamber to said container so as to fill said closed chamber and both to envelope and to fill the assembly therein with the gas, sealing mechanism arranged in said chamber and operative hermetically to seal the opening into the bag while the assembly is in said closed chamber and is both enveloped and filled with the gas therein so as to trap a charge of the gas in the sealed bag, third means governed by said program controller then for disconnecting said closed chamber from said container and for operating said sealing mechanism, and fourth means governed by said program controller then for reconnecting said closed chamber to said vacuum pump and for moving said door from its closed position into its open position so that the residual gas is purged from said then open chamber.

11. The machine set forth in claim 10, and further comprising a pressure regulator for maintaining the pressure of the gas introduced into said closed chamber at a predetermined pressure disposed somewhat below atmospheric pressure.

12. The machine set forth in claim 11, and further comprising fifth means governed by said program controller for heating said chamber, and a temperature regulator for controlling said heating means so as to maintain the temperature of the gas introduced into said closed chamber at a predetermined temperature disposed somewhat above the ambient temperature.

13. A machine for making a heat-insulating unit comprising structure defining a chamber having a doorway thereinto, a door cooperating with said doorway and movable between open and closed positions with respect thereto, said open chamber being adapted to receive through said doorway an assembly including a self-supporting deformable porous slab of solid poor heat-conducting material and an enclosing flexible bag having an opening in one end thereof and formed of material that may be readily sealed by applicatoin thereto of heat and pressure, a pair of relatively movable electrodes arranged in said chamber and normally disposed in spaced-apart relation and arranged to receive therebetween the end of the bag having the opening therein when the assembly is placed in said open chamber, a program controller, first means governed by said program controller while said door is in its closed position for evacuating said closed chamber so as to remove the air therefrom and from the assembly therein, second means governed by said program controller then for introducing a gas having a coefficient of thermal conductivity lower than that of air into said closed chamber so as to fill the same and both to envelope and to fill the assembly therewith, third means governed by said program controller then for moving said electrodes toward engagement so as to clamp the adjacent end of the bag therebetween, and fourth means governed by said program controller then for applying a potential between said electrodes while they are in their clamped position and while the assembly is in said closed chamber and is both enveloped and filled with the gas therein in order to effect hermetic sealing of the clamped end of the bag so as to trap a charge of the gas in the sealed bag.

14. The machine set forth in claim 13, wherein one of said electrodes is movable and is electrically connected to said structure and the other of said electrodes is stationary and is electrically insulated from said structure, and wherein said fourth means for applying a potential between said electrodes includes a first grounded conductor electrically connected to said structure and a second ungrounded conductor electrically connected to said other electrode.

References Cited in the file of this patent

UNITED STATES PATENTS

| | | |
|---|---|---|
| 1,942,162 | Campbell | Jan. 2, 1934 |
| 2,016,045 | Munters | Oct. 1, 1935 |
| 2,102,716 | Berch | Dec. 21, 1937 |
| 2,149,790 | Roesch | Mar. 7, 1939 |
| 2,509,181 | Zimmerman | May 23, 1950 |
| 2,685,520 | Martin | Aug. 3, 1954 |
| 2,730,281 | Prohaska | Jan. 10, 1956 |
| 2,778,177 | Mahaffy et al. | Jan. 22, 1957 |
| 2,780,043 | Hensgen | Feb. 5, 1957 |
| 2,817,124 | Dybvig | Dec. 24, 1957 |